United States Patent [11] 3,536,028

[72] Inventor Marie Francoise Adaglio
 31, rue des Deux Ponts, Paris, France
[21] Appl. No. 680,821
[22] Filed Nov. 6, 1967
[45] Patented Oct. 27, 1970
[32] Priority Dec. 29, 1966
[33] France 89,270; May 17, 1967, 106,656;
[31] July 6, 1967, 113,291

[54] WARNING DEVICE FOR CYLINDERS FOR LIQUIFIED GAS UNDER PRESSURE
 3 Claims, 7 Drawing Figs.
[52] U.S. Cl. ............................................. 116/109, 116/112
[51] Int. Cl. ......................................... G01f 23/08
[50] Field of Search........................................ 116/112, 70, 109; 137/202, 213; 62/129, 131; 73/309

[56] References Cited
UNITED STATES PATENTS

| | | | |
|---|---|---|---|
| 1,723,173 | 8/1929 | Huggins............................ | 73/309 |
| 2,872,298 | 2/1959 | Van Loenen.................... | 137/202X |
| 2,895,504 | 7/1959 | Lederer........................... | 116/70X |
| 3,024,760 | 3/1962 | Enrico ............................ | 116/109 |
| 3,386,410 | 6/1965 | Barnes............................. | 116/70 |

FOREIGN PATENTS

| | | | |
|---|---|---|---|
| 800,729 | 7/1936 | France ........................... | 116/34 |

Primary Examiner—Louis R. Prince
Assistant Examiner—Daniel M. Yasich
Attorney—Young & Thompson ABSTRACT: A warning device for a cylinder for liquified gas under pressure for indicating to the operator when the level of gas in the cylinder is getting low, with a sleeve supported in the interior of the cylinder by a coupling connected to the tap at the said cylinder and two orifices which can communicate with the interior of the cylinder, each being provided with a flap valve, one flap valve being urged to closure by a movable weight immersing in the liquid and to open by means exerting a substantially constant action on it; the second flap valve being subjected to the action of the pressure of gas in the cylinder which urges it into its open position against the action of opposing means.

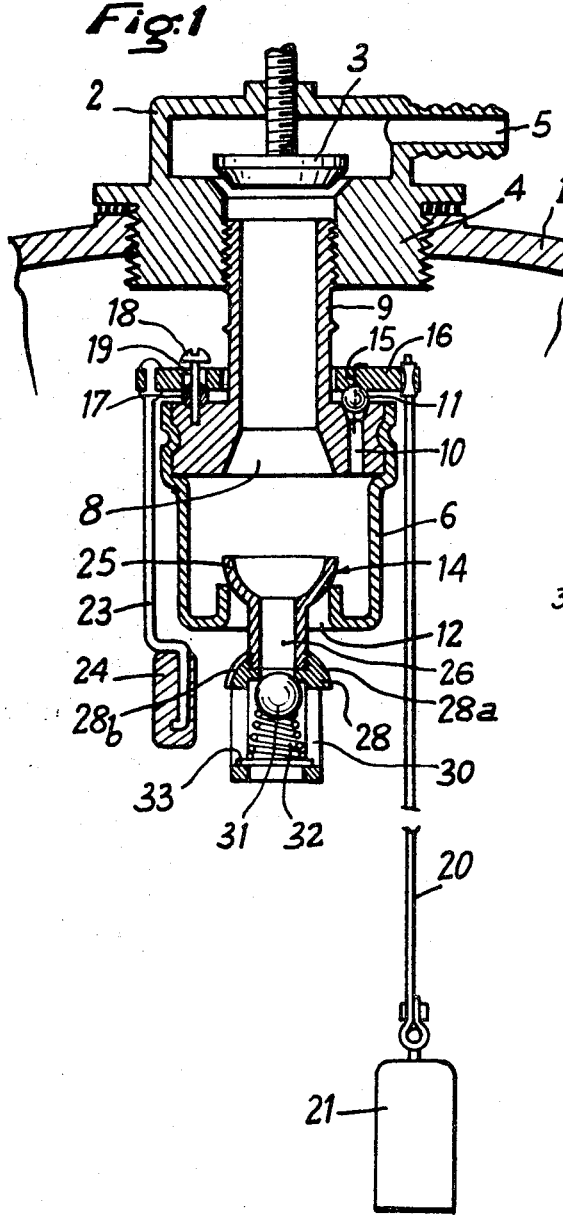
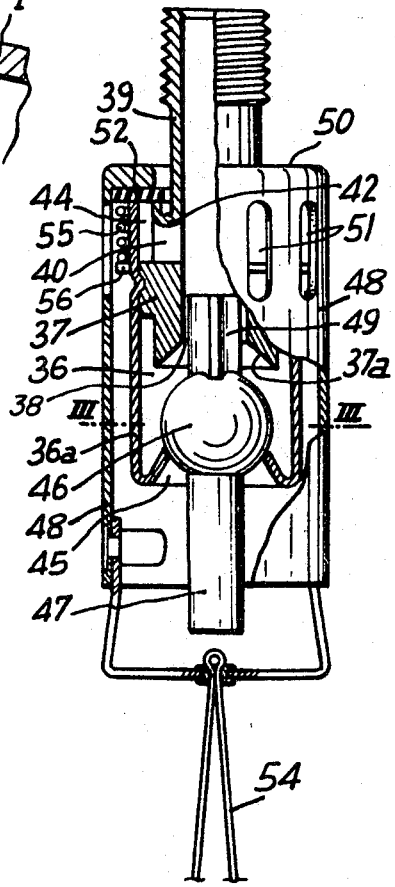
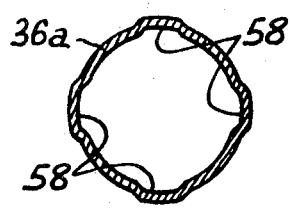
INVENTOR
MARIE FRANÇOISE ADAGLIO
BY Young & Thompson
ATTYS

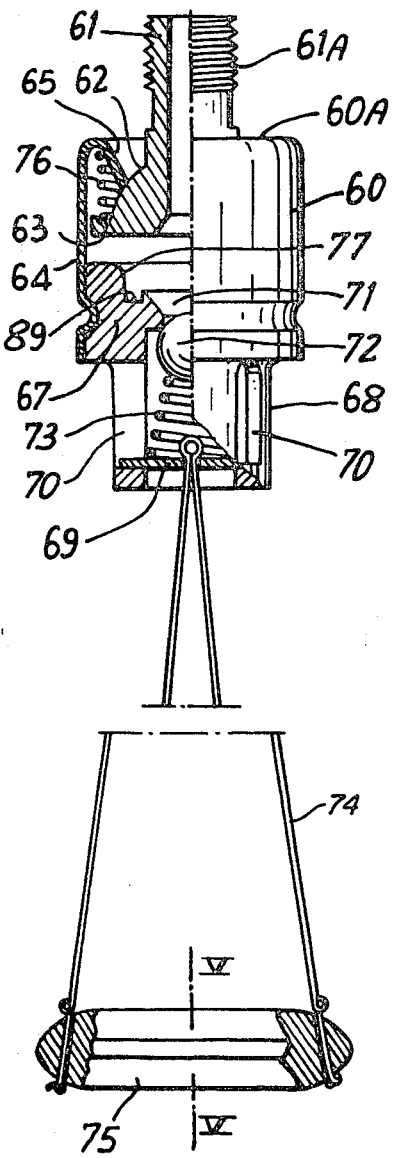
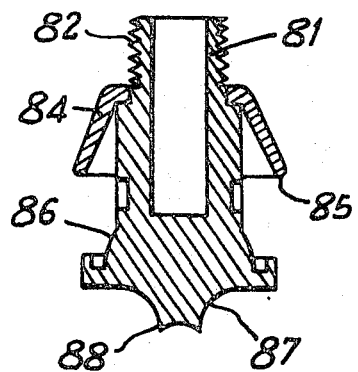
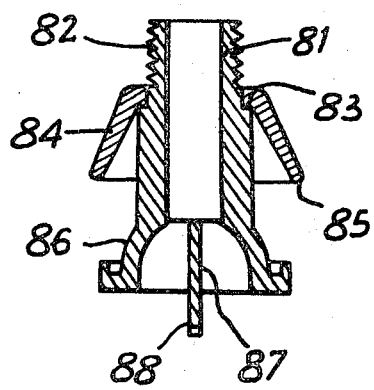
INVENTOR
MARIE FRANÇOISE ADAGLIO
BY Young + Thompson
ATTYS.

WARNING DEVICE FOR CYLINDERS FOR LIQUIFIED GAS UNDER PRESSURE

The invention relates to a warning device adapted to be installed in a cylinder for liquified gas under pressure for the purpose of signaling, in the course of the withdrawal of the gas, the moment when the liquid reaches a certain level, which can for instance be that when the cylinder is almost empty.

The warning device of the invention has the feature that it comprises a sleeve which defines a chamber and which is supported in the interior of the said cylinder by a coupling connecting to the tap of the said cylinder and having two orifices which can communicate with the interior of the cylinder and are each provided with a flap valve, the flap valve of the first orifice being urged into its closed position by a movable weight which immerses in the liquid and into its open position by means exerting on it an action which is substantially constant and intermediary, against the opposing action of the weight completely immersed in the liquid and that of the said weight which is at least partially immersed in the said liquid, the flap valve of the second orifice being subjected to the action of the pressure of the gas in the cylinder, which tends to urge it into its open position against the action of opposing means.

In using the apparatus, the first orifice remains open while the cylinder contains a sufficient amount of liquified gas; then, when the weight is only partially immersed, its action becomes predominating and it urges the flap valve of this orifice into its closed position. The gas accordingly has to pass through the second orifice, and causes the flap valve of the latter to clack; the resulting noise warns the operator that the cylinder is practically empty.

The invention will now be described as applied to various embodiments of the warning device of the invention, and with reference to the accompanying drawings, which are given by way of example only and in no restrictive sense.

FIG. 1 is a view in longitudinal section of the warning device of the invention, with fixed internal chamber.

FIG. 2 is a longitudinal half-section and half-elevation of another embodiment of the warning device of the invention.

FIG. 3 is a cross section through the internal chamber of the device of FIG. 2.

FIG. 4 is a view similar to that of FIG. 2 of a third embodiment of the invention, with mobile internal chamber.

FIG. 5 is a vertical section along the line V–V of FIG. 4.

FIG. 6 is a longitudinal section of a variation of the coupling of the warning device of FIG. 4.

FIG. 7 is a section along the line VII–VII of FIG. 6.

The warning device as illustrated in FIG. 1 is installed in the interior of a cylinder 1 by coupling with the upper tap 2 which closes by means of a screw valve 3 and is screwed on the said cylinder by its mouthpiece 4; 5 is the discharge nozzle.

The device forming the object of the invention has a sleeve 6 which defines a chamber and whose upper portion has a central orifice 8 extended by means of a hollow coupling 9 screwed in the interior of the mouthpiece 4 of the tap 2 and supporting the sleeve 6 in the interior of the cylinder. This sleeve 6 carries at its upper portion an orifice 10 which is adapted to be obturated by a sphere 11 forming a flap valve.

The base of the sleeve 6 has an orifice 12 which can be obturated by a second flap valve 14 which constitutes the warning device whose functioning will be explained below.

The first flap valve 11 is connected by a rod 15 to a lever 16 articulated to a ball-and-socket joint 17 which is mounted on the stem of a screw 18 passing through an opening 19 in the lever 16 and screwed in the upper wall of the sleeve 6.

A weight 21 is attached by means of rod 20 to one end of the said lever, said weight descending to a slight distance from the bottom of the cylinder and normally completely immersed in the liquified gas.

A counterweight 24 is attached by means of rod 23 to the other end of the lever 16. The said counterweight is arranged to exert on the lever 16 a couple which is greater than that which the weight 21 exerts, in the contrary direction, when the latter is completely immersed and is subjected to an upward thrust called "Archimedes thrust" equal to the weight of the volume of liquid displaced, but less than that which the said weight exerts in the absence of the Archimedes thrust.

The lower flap valve 14 has a hemispherical cup 25 which under the influence of the weight of the flap valve rests on the edge of the lower orifice 12 which forms a valve seat. This flap valve 14 is extended by means of a pipe 26 opening out at its upper portion into a central orifice of the bottom of the cup 25, and, at its lower portion, into a bell 28 having lateral openings 30.

It is accordingly possible for the pipe 26 to ensure communication between the interior of the cylinder and the interior of sleeve 6. However, the upper opening of the bell 28 is normally obturated by a valve whose flap 31, here constituted of a sphere, is applied against its seat by a spring 32 supported on the bottom 33 of the bell 28.

The said valve 31 does not play any special role in the functioning of the warning device itself, and is principally intended to permit the filling of the cylinder with liquified gas through its upper opening, by virtue of the pressure exerted by the entering liquefied gas on the upper surface of the sphere 31. This pressure opens valve 31 against the action of spring 32

Preferably, the upper face of the bell 28 is spherical, as shown at 28a, and, by sliding upwardly, can apply itself underneath the bottom of the chamber 6, obturating the orifice 12. Under these conditions, if, as the result of faulty operating, the nozzle 5 is put into direct communication with the atmosphere, the face 28a of the bell applies itself on the orifice 12, forming a check valve and preventing the gas under high pressure contained in the cylinder 1 from flowing out If desired, a groove 28b can be provided in the said upper face 28a to allow a limited flow of gas to take place notwithstanding.

The functioning of the warning device which has just been described is as follows: when the cylinder is full, and while it contains sufficient liquified gas to ensure the at least partial immersion of the weight 21, the counterweight 24 has a predominant action and, by the rocking of the lever 16, effects the opening of the upper flap valve 11. The gas under pressure located above the liquified gas in the interior of the cylinder escapes by passing through the conduit 10 and the orifice 8 towards the discharge nozzle 5.

When the level of the liquified gas drops, the weight 21 is progressively exposed, and the latter, subjected to less and less Archimedes thrust, becomes predominant at a certain moment in relation to the action of the counterweight 24, and this brings about the closing of the flap valve 11. However the gas under pressure contained in the sleeve 6 continues to escape, so that the pressure in the interior of the latter falls rapidly, and at the moment when it becomes less than the internal pressure of the cylinder the lower flap valve 14 temporarily raises itself; the pressure equilibrium which results brings about a fresh closing of the flap valve 14

The phenomenon is repeated at intervals, resulting in clacks of the flap valve 14 on its seat, said clacks constituting the sound warning indicating to the operator that the level of the liquified gas in the cylinder has fallen.

The value of the counterweight and the length of the rod 20 are regulated in such a way that the sound warning is given for a predetermined level of liquified gas in the cylinder, the said level being calculated for instance in such a way as to permit the completion of an operation of short duration which is taking place, after which the operator will have to replace the cylinder in use by a full one.

The device illustrated in FIG. 2 has an internal chamber 36 defined by a sleeve 36A which is secured to an annular member 37; the central opening 38 of this member is axially aligned with a hollow coupling 39 which is screwed into the mouthpiece of the tap of the cylinder, as in the preceding case This hollow fixing coupling 39 is pierced towards its base by orifices 40 bounded by a circular flange 42 which is separated from the wall 36A of the internal chamber 36 by means of an annular orifice 44 which constitutes the upper orifice of the internal chamber 36.

The sleeve 36A has at its base a central orifice 45 whose edges form the seat for a spherical flap valve 46 loaded by a tail 47, or for a flap valve identical to that illustrated at 14 in FIG. 1, or for a flat flap valve. The flap valve can have at its upper portion an axial extension 49 which ensures the guiding of the flap and whose section is preferably a triangle or a square with externally concave faces, in order to reduce the pressure drops. The internal chamber 36 is covered by a cylindrical jacket 48 in the form of a bell, whose base 50 is pierced axially by the coupling 39, along which it can slide. The said jacket has lateral openings 51 in its upper portion.

In the interior of the said base 50 a resilient ring 52 is mounted, which forms an upper flap valve by covering the top of the annular orifice 44.

On the cylindrical jacket 48 there is exerted on the one hand the action of a weight, connected to the said jacket by means of rod 54, the said weight immersing in the liquified gas, and on the other hand the opposing action of a helicoidal spring 55 bearing at its lower portion on a shoulder 56 provided on the exterior of the wall of the chamber 36 and, at its upper portion, on the joint 52 provided in the base 50 of the cylindrical jacket 48.

FIG. 3 is a cross section of the lower portion of the lateral wall 36A of the internal chamber 36.

It can be seen that the said lateral wall has at this place hollows 58 which increase the passage section of the gas, whereas the remaining part of the wall ensures good guiding for the sphere 48 which forms a flap valve.

The functioning of the warning device of FIG. 2 is the same as that of the device of FIG. 1.

Normally, when the immersion of the weight (not illustrated) is complete, the opposing spring 55 predominates, and by lifting the cylindrical jacket 48 opens the flap valve 52 which exposes the annular orifice 44 through which the gas escapes towards the tap of the cylinder, passing through the lateral orifices 40.

When the weight is only partially immersed in the liquid, the obturating sphere 46 of the lower flap valve causes warning clacks, in accordance with the process described above.

Moreover, if the nozzle 5 communicates directly with the atmosphere, the sphere 46 applies itself onto the annular diaphragm 37, which preferably has a projecting flange 37a forming a flap valve seat, which arrests the discharge of the gas.

In the embodiment shown in FIGS. 4 and 5 the sleeve 60 is movable.

The said sleeve is supported in the interior of the cylinder by the hollow coupling 61 which is screwed by means of its external screw-threaded portion 61A into the mouthpiece of the tap of the cylinder, by the same method of fixing as that shown in FIG. 1.

However, the said hollow coupling 61 has at its lower portion an enlargement 62 or toric or spherical surface, whose base has a circular channel 63. The lateral wall 64 of the sleeve 60 has at its upper portion an internal flange 65 which forms a flap valve, by resting on the toric surface 62 of the coupling 61, which constitutes the seat of this flap valve.

The lateral wall 64 of the sleeve 60 is closed at its lower portion, for instance by being mounted on an annular plug 67, extended at its lower portion by a pipe 68 whose base is closed by a small plate 69 and whose lateral walls have gaps or orifices 70.

The central orifice 71 of the annular plug 67 can be obturated by a spherical flap valve 72 pressed onto its seat by a helicoidal spring 73 which rests on the small obturating plate 69. This flap valve opens against the action of spring 73 during the filling of the cylinder, in accordance with the process described with reference to the embodiment of FIG. 1.

The small plate 69 is pierced at its centre by a central orifice in which is imprisoned with play the loop of a supple wire or thread extending towards the bottom of the cylinder with two strands 74, to the end of which strands an oblong weight 75 is attached in horizontal arrangement. For manufacturing reasons, the said weight is preferably of the ribbed type illustrated in cross section in FIG. 5.

The movable sleeve 60 constituted as described above is accordingly subjected to vertical traction from the top downwardly, due to the weight relieved by the Archimedes thrust of the liquid, which normally covers it entirely.

On the other hand, the movable sleeve 60 is subjected to the opposing action of a helicoidal spring 76 housed in the interior of its upper portion and resting on the one hand on the base of the coupling 61 by inserting itself in its circular channel 63, and on the other hand on the base 60A of the sleeve 60.

The functioning of this device will be clear from that of the devices previously described.

When the weight 75 is completely immersed in the liquid and by reason of this fact is relieved by Archimedes thrust, the opposing spring 76 has predominant action and opens the flap valve 65 by raising the movable sleeve 60 which slides on the coupling 61.

The gas escapes through the central orifice of the coupling after passing between the lateral wall 64 of the sleeve and the base of the toric seat 62 of the coupling 61.

With progressively less immersion of the weight 75, its action becomes predominating, and the movable chamber is lowered so that it occupies the position shown in FIG. 4, closing the flap valve 65.

The drop is pressure downstream which then occurs again brings about the raising of the movable sleeve 60, the renewal of the process causing warning clacks to be sounded from the flap valve 65, which then plays alternatively the role of control valve and of warning valve.

In this case also, if the nozzle 5 is put in direct communication with the atmosphere, the annular plug 67 rises again and its upper face 77 applies itself under the base of the coupling 61, preventing the discharge of gas. If desired, a groove can be provided in this upper face to permit a restricted discharge of gas notwithstanding.

A variation of the fixing coupling shown at 81 in FIGS. 6 and 7 has at the base of its screw-threaded portion 82 a shoulder 83 on which rests a small elastic collar 84 in the form of a conical skirt, whose lower edge 85 is tapered.

At the level of the toric seat 86 the coupling has a thin transverse partition 87 whose lower extension 88 extends below the lower level of the base of the coupling 81. The small elastic collar 84 plays a number of roles:

1. As its upper portion is clamped to the mounting between the shoulder 83 and the mouthpiece of the tap of the cylinder, said upper portion forms a sealing joint.

2. The tapered edge 85 of the skirt forms a screen for the slight annular opening necessitated by the sliding of this chamber on the coupling 81.

The plug 67 has an internal channel 89 and the internal extension 88 of the partition 87 has insufficient length for it to come into contact with the spherical flap valve 72 when the plug 67 is applied against the coupling 61.

When it is desired to empty the cylinder of the liquified gas which it contains, one turns it upside down in such a way that the coupling 61 is directed downwardly, at an angle of inclination of approximately 45°. The extension 88 of the partition 87 then engages in the channel 89 and thus prevents the upper face 77 of the diaphragm 67 from resting on the base of the coupling 61.

This arrangement could be applied to the embodiment of FIG. 1, the channel being provided at the base of the coupling 9 whereas the partition is provided in the cup and projects upwardly in relation to the latter.

The warning device in accordance with the invention has the advantage of great simplicity together with the possibility of various embodiments allowing application to the most varied cases. Its usefulness is great, since by its use, the operator of liquid fuel cylinders is no longer under the serious disadvantage of encountering a sudden, unexpected and final stoppage of the flow of gas resulting from the using up of the supply of gas in liquid phase.

I claim:

1. A warning device for the level of liquid in containers of liquified gas under pressure, which releases a warning sound when the liquid phase, during emptying, reaches a predetermined level, comprising a connecting coupling having a passageway therethrough for the escape of gas from the container, a sleeve surrounding and movable relative to the lower end of the coupling in the container, the sleeve having an upper edge that is turned down to seat against the outer surface of the lower end of the coupling, the sleeve defining within itself a chamber that remains in communication with the passageway of the coupling, a weight of greater density than the density of the liquified gas and disposed adjacent the bottom of the container, means suspending the weight from the sleeve, the sleeve closing the passageway when the downturned upper edge of the sleeve is in contact with the coupling, and resilient means urging the sleeve away from the position in which it seats against the coupling with a force greater than the downward force exerted by the weight when the weight is fully immersed in the liquified gas but less than the downward force exerted by the weight when the weight at least partially emerges from the liquified gas.

2. In a warning device for the level of liquid in containers of liquified gas under pressure, including a connecting coupling having a passageway therethrough for the escape of gas from the container, the coupling having a seat thereon within the container on which a member rests by gravity and which can rise and fall repeatedly upon the seat to give a warning sound when the liquid level in the container is below a predetermined minimum; the improvement comprising a weight supported by the coupling and having a density greater than the density of the liquid in the container and disposed adjacent the bottom of the container, means supported by the coupling and urged by the weight to close the passageway to the flow of gas therethrough, and means supported by the coupling and acting on said closing means upwardly against the weight with a force which is greater than the downward force exerted by the weight when the weight is fully immersed in the liquid in the container but less than the downward force exerted by the weight when the weight at least partly emerges from the liquid in the container.

3. A device as claimed in claim 2, said weight-urged means comprising a sleeve that surrounds the coupling within the container and that has a downturned upper edge that seats against an outer surface of the coupling to close said passageway, said means acting on said closing means comprising spring means acting between the coupling and the sleeve to urge the sleeve upwardly.